Dec. 12, 1967     J. FISCHBACH     3,357,175

METHOD AND APPARATUS FOR POWER GENERATION

Filed Jan. 23, 1967     3 Sheets-Sheet 1

INVENTOR.
JACOB FISCHBACH

BY *Auslander Thomas*

ATTORNEYS.

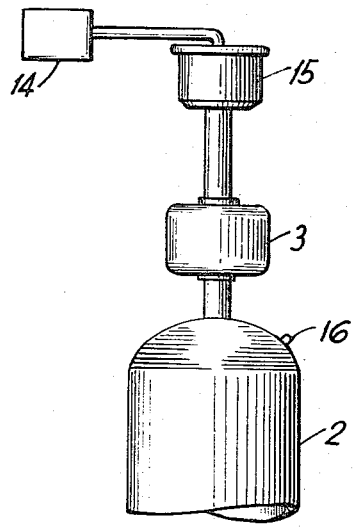
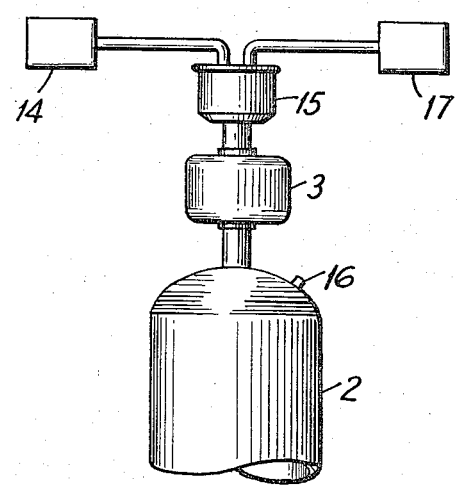
FIG. 4    FIG. 5
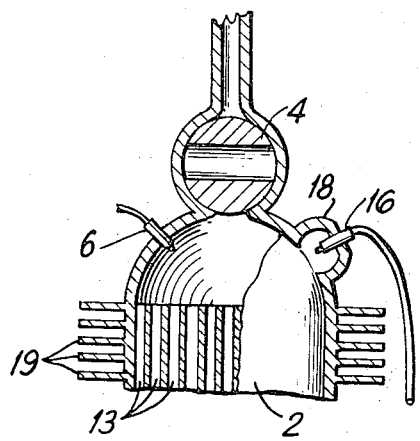
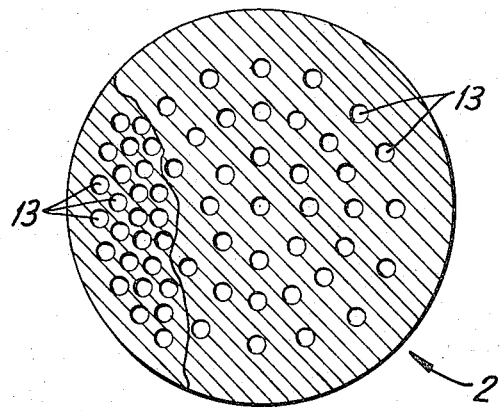
FIG. 6    FIG. 7
INVENTOR.
JACOB FISCHBACK
ATTORNEYS.

Dec. 12, 1967   J. FISCHBACH   3,357,175
METHOD AND APPARATUS FOR POWER GENERATION
Filed Jan. 23, 1967   3 Sheets-Sheet 3
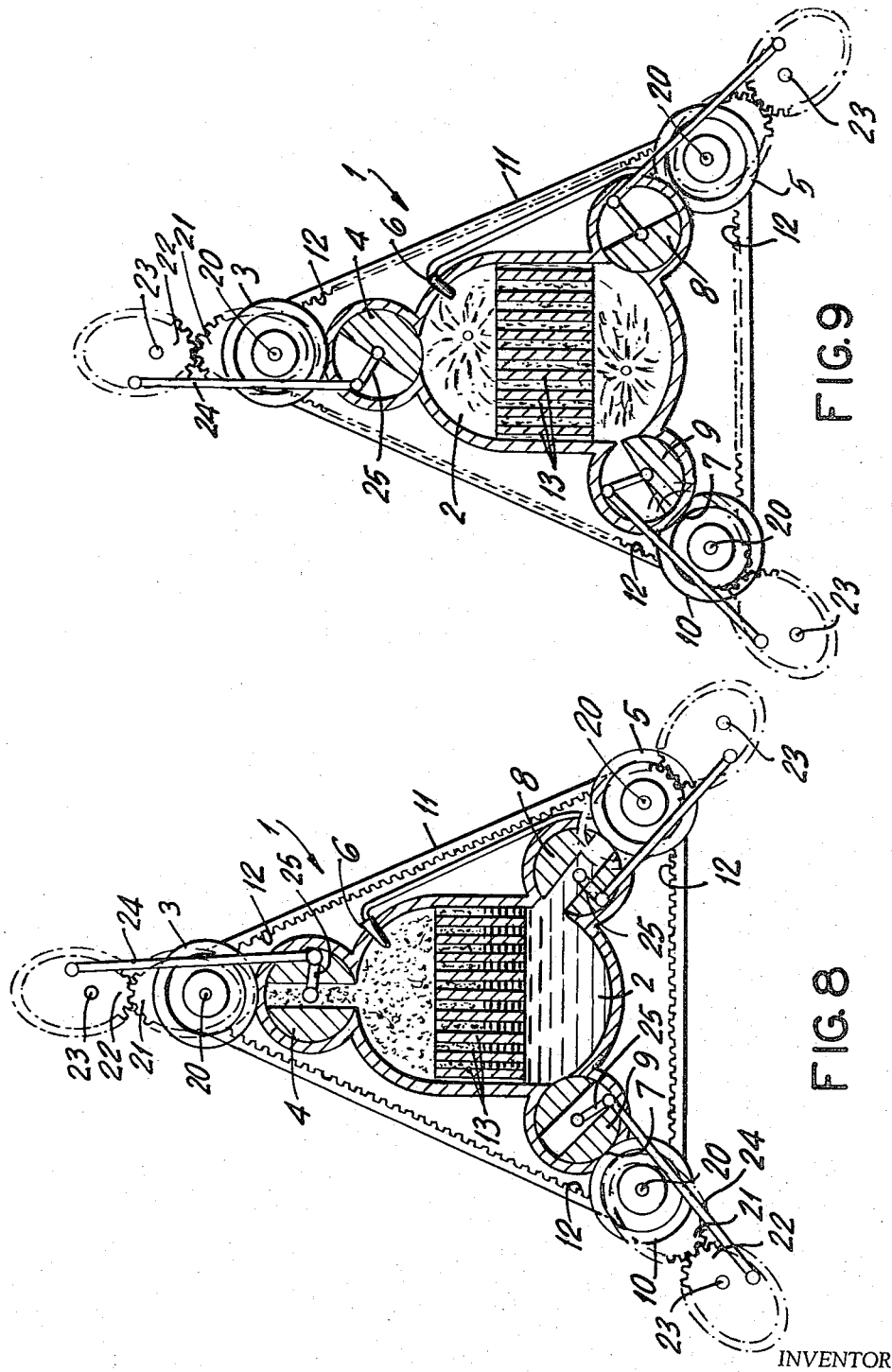
INVENTOR.
JACOB FISCHBACH
BY
Auslander & Thomas
ATTORNEYS

United States Patent Office 3,357,175
Patented Dec. 12, 1967

3,357,175
METHOD AND APPARATUS FOR
POWER GENERATION
Jacob Fischbach, 3439 Knox Place, Bronx, N.Y. 10467
Filed Jan. 23, 1967, Ser. No. 621,380
14 Claims. (Cl. 60—39.06)

ABSTRACT OF THE DISCLOSURE

The present invention relates to a method and apparatus for a new type of power generator wherein a pistonless engine is provided having a single chamber into which is introduced two combustion sources which are under pressure within the chamber the ignition thereof effecting an explosion of both combustion sources and the utilization of such explosive force. The chamber may be provided with transfer passengers providing for separation yet interconnection within the chamber, whereby an explosion of vaporized fuel produces an explosion of contiguous liquid fuel. The present application is in continuation-in-part of co-pending application Ser. No. 481,184 filed Aug. 20, 1965, now abandoned.

---

The present invention relates to a method and apparatus for a new type of power generator and is a continuation-in-part of my copending application Ser. No. 481,184 filed Aug. 20, 1965, now abandoned.

In the past, power has been generated by conventional internal combustion engines employing gasoline or diesel fuel, steam turbines and more recently gas turbines. These devices have generally combined either with or without ignition systems, pistons or combustion chambers leading to turbines. In the main, piston engines are employed; however, numerous pistonless internal combustion designs are known.

In use, these prior devices have provided pressure for driving forces by combustion driving a piston or creating a pressure which was transferred to a turbine and utilized. The combustion, either in piston or pistonless engines was of an atomized fuel and while some devices employed a non-carburated fuel it was for the purpose of creating heat to aid in a reaction as distinguished from a true application of the explosive force of such fuel.

According to the present invention a pistonless engine is provided having a single chamber into which is introduced two combuston sources which are under pressure within the chamber, the ignition thereof effecting an explosion of both combustion sources and the utilization of such explosive force.

By provision of a chamber subdivided into two parts by the interposition of transfer passages therebetween a caisson like effect is created providing for separation yet interconnection within the chamber whereby an explosion of vaporized fuel produces an explosion of contiguous liquid fuel. The pressure induced within the chamber and its concomitant effect of temperature increase both aids in the ignition of the raw fuel and combines the driving force of the compressed fluid with the driving force of the ignited raw fuel.

The principle of the almost simultaneous ignition of fuel is somewhat akin to the "backfire" of gasoline in the ordinary piston engine, but in this instance, a contrived and controlled ignition.

The efficiency in ignition and the absence of a piston to transmit the explosive energy provides the present invention with a simplicity over piston engines with an adaptability to uses presently served by the gas turbine engine. The simplicity of structure additionally provides a marked advance over pistonless engines of the past and in view of the absence of movable mechanical structure in the explosion chamber itself and the desirability of heat as conductive to efficiency no cooling mechanisms or systems need be employed, although if desired for specific needs, such cooling systems can be readily included.

Although such novel feature or features believed to be characteristic of the invention are pointed out in the claims, the invention and the manner in which it may be carried out may be further understood by reference to the description following and the accompanying drawings.

FIG. 4 is a schematic form of operating one embodiment of the present invention.

FIG. 5 is a schematic form of operating another embodiment of the present invention.

FIG. 6 is a section view showing details of various operational features.

FIG. 7 is a section of FIG. 3 at lines 7—7.

FIG. 8 is a sectional detail of an embodiment of the present invention with an elliptical gearing arrangement.

FIG. 9 is a sectional detail of another embodiment of the present invention.

Referring now to the figures in greater detail, where like reference numbers denote like parts in the various figures.

Figure 1:
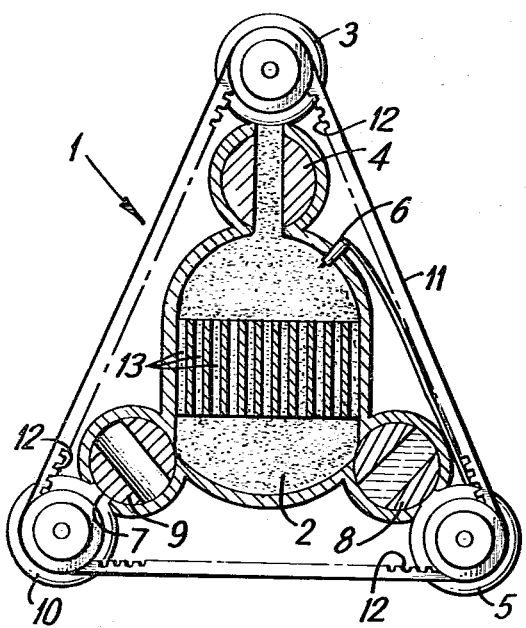
FIG. 1 is a section view of an embodiment of the present invention with the one combustion source valve in open position.
Figure 2:
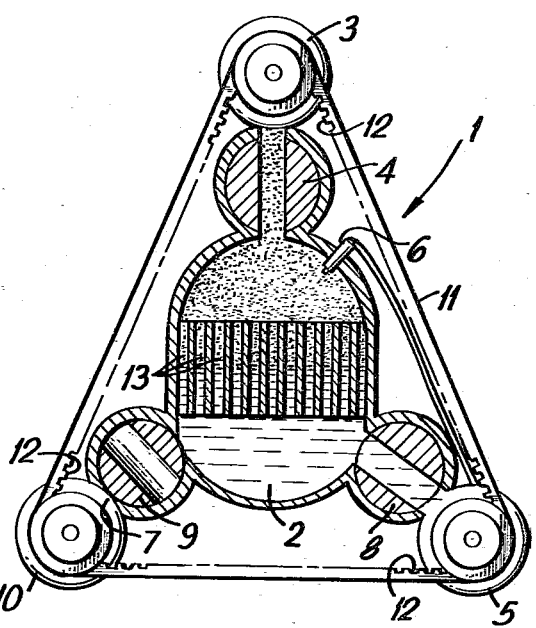
FIG. 2 is a section view with two combustion source valves in open position.
Figure 3:
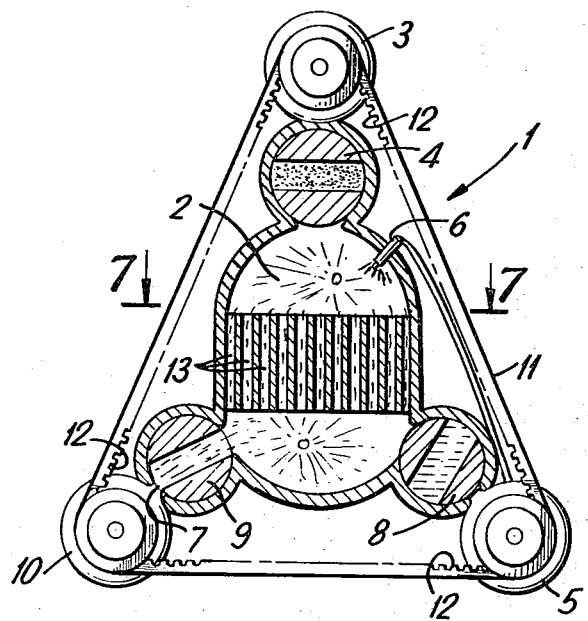
FIG. 3 is a section view with the exhaust valve in open position.

As shown in FIGS. 1-3 the engine 1 comprises chamber 2, a series of three valves 4, 8 and 9 and in this embodiment a compressor 3, fuel pump 5, turbine 10 and injector 6 are shown. Chamber 2 is subdivided into two parts by the interposition of transfer passages 13.

Air is introduced through air inlet valve 4 and compressed by compressor 3. Raw fuel is pumped by fuel pump 5 into chamber 2 through valve 8. The raw fuel entry within the chamber further serves to further compress the air.

While the transfer passages 13 serve to substantially prevent the raw fuel from entering into the upper section of chamber 2 due to the air pressure in the upper chamber with the transfer passages acting in a caisson like maner, a portion of the raw fuel within the passages 13 may be subject to minor aeration, however; in the main the chamber 2 now contains raw fuel in its lower section, compressed air in its upper section with separation and possible minor comingling effected by transfer passages 13.

A spray of raw fuel is introduced into the combustion chamber 2 through the injector 6, the injector 6 preferably located at a point above the transfer passages 13. The injector 6 may also be interconnected with fuel pump 5 as shown or a separate fuel supply may be provided.

The pressure of the compressed air in the combustion chamber 2 raises the internal temperature to a point beyond the heat of ignition of the air and fuel injected admixture, causing ignition of the mixture. Such initial ignition may be supplied by auxiliary means such as hereinafter described.

The temperature of this first or primary ignition ignites the raw fuel to explosion, and the force generated by both the primary and secondary ignitions is emitted through the valve 9 and valve 9 outlet 7.

It is preferable to have the valves 4, 8 and 9 open and close in a manner such as would show as a progressive reading of FIGS. 1-3 whereby valves 8 and 9 are first in closed position and valve 4 is in open position. The compressed air enters through valve 4 into the chamber 2. Valve 4 remains in open position allowing continued entry of compressed air as valve 8 opens and the full desired amount of raw fuel is introduced. The raw fuel preferably is sufficient to fill the lower section of the chamber 2.

Valves 4 and 8 are then closed and the injection of a fuel spray through injector 6 occurs and ignition occurs as valve 9 begins to open. It is additionally preferable for valve 4 to begin to open before valve 9 is completely closed so as to provide a more complete exhaust of chamber 2.

While such cycling of the valves is preferable, the process can be accomplished by combining steps one and two, that is by having the air inlet valve 4 and the raw fuel valve 8 in open and closed positions at approximately the same time and for the same length of time, and/or by the differing of the internal opening sizes and/or angular positions of the openings of valves 4, 8 and 9 so as to provide for a simplified mechanical co-ordination of the cycling.

Although it is believed that various methods and systems for timing and movement for cycling the valves 4, 8 and 9 are known in the art, as hereinafter described an elliptical gearing arrangement such as shown in FIGS. 8 and 9 is readily employable.

Various arrangements of the transfer passages 13 are possible. They are oftentimes effective at $7/32''$ diameter spaced $1/16''$ apart as shown in detail in FIG. 7 or at other distances and sizes. In some applications wherein uninterferred contact between raw fuel and mixed fuel is not undesirable such as where it is desired that a minor admixture occur to enrich the lean fuel mixture to promote a higher heat at ignition, the transfer passages 13 may be dispensed with.

While the cycle of the engine 1 of the present invention as shown in FIGS. 1–3 is based upon primary ignition by compression heat, primary ignition may be achieved by various other modes.

As shown in FIG. 4 a fuel is introduced into the combustion chamber 2 from a fuel source 14 passing through a carburetor 15 before being compressed by the compressor 3.

Initial ignition may be controlled by a spark plug 16, or a combination such as shown in FIG. 6 of both a spark plug 16 and injector 6. A bubble 18 may protect the spark plug 16 from being fouled by liquid fuel especially in those embodiments wherein the transfer passages are not employed.

As shown in FIG. 5, where required, such as in aerospace applications, the engine 1 of the present invention may have its own oxygen source 17.

Although heat especially in those embodiments where the compression heat initiates the primary ignition is desirable, temperature may be controlled if desired by cooling fins 19 such as shown in FIG. 6 or other means known in the art.

As shown in FIGS. 3, 9, the explosive force emitted from valve 9 may partly be transmitted to a turbine 10 which in turn may drive the drive belt 11 operating the compressor 3 and pump 5. The drive belt 11 may have cogs 12 throughout its length to improve its movement transmittability.

The valves 4, 8 and 9 may also be cycled by the belt 11 rotation, the belt 11 causing rotation of shafts 20 to which is mounted a pair of elliptical gears 21, 22. The driving gears 21 and the driven gears 22 are of the same proportions and size and each gear revolves about one of its foci as a fixed center. The difference between the shaft center 20 of the driving gears 21 and the shaft center 23 of the driven gears 22 is made equal to the length of the common major axis. The angular velocity ratio varies according to the respective radii of the driving gears 21 and driven gears 22 at the point of contact.

If shaft 20 rotates at a uniform speed, the angular velocity of the shaft 23 will decrease during the first half revolution from the position shown in FIG. 8, then increase during the remaining half revolution. When the gears 21, 22 are in the position shown the angular velocity of the driven shaft 23 is maximum, the side of the driver gear 21 having the longest radius is in contact with it. As the drive gear 21 revolves, the radius at the point of contact gradually decreases and consequently, the angular velocity decreases until the shortest radius of the driving gear 21 has passed the point of contact whereupon the angular velocity then gradually increases until it is again at a maximum.

As shown in FIG. 8, the driven gear 22 is interconnected by means of a shaft 24 and crank 25 arrangement with its respective valve, such as valve 9. The variable motion obtained from the gearing is thereby utilized to so control the motion of the valves 4, 8 and 9. The actual number of revolutions made by each shaft in a given time is the same, and the driving gears 21 and the driven gears 22 both require the same time to complete the half revolution between the two positions representing the minimum and maximum angular velocities.

In effect, a dwelled, then quick return cycle is imparted to each valve 4, 8 and 9 so as to impart for example dwell to the valves 4, 8, and 9 when in open position and a quick return when they are closed or closing.

Other cycling means are not shown however intermittant cycling may be provided by other means known in the art.

As shown in FIG. 9, the valves 4, 8 and 9 of the present invention are shown wherein the opening in the valves are peripheral, that is in lieu of the somewhat centralized openings of the valves as shown in FIGS. 1–4 and 8, the rotary valves 4, 8 and 9 of FIG. 9 are segmented. In this manner cycling may be more readily controlled since the size and shape of the cut-away area of the valves may be of varying proportions and the angular velocity of rotation more readily contrived and controlled.

The engine 1 of the present invention is adaptable for use in multi units so as to prevent pulsation and/or possible back pressure on the compressor or pump when valves 4 and 8 are in closed position.

The force generated by the engine 1 of the present invention may be utilized for jet propulsion or by known means such as interconnecting the turbine 10 to a second turbine (not shown) a drive such as for an automotive transmission could be provided.

Combinations of fuels have not been clearly shown in the figures since it is considered within the scope of the present invention to have different fuels entering the combustion chamber 2 to achieve the end result of the present invention. For instance, a liquid fuel may be introduced through the valve 8 while a solid fuel is injected through the injector 6.

The terms and expressions which are employed are used as terms of description; it is recognized, though that various modifications are possible within the scope of the invention claimed.

Having thus described certain forms of the invention in some detail, what is claimed is:

1. A power generator comprising a combustion chamber including a first inlet adapted to admit a compressible fluid, said compressible fluid adapted to sustain combustion, a second inlet in said combustion chamber adapted to admit a liquid fuel, outlet means in said combustion chamber, compression means adapted to compress said compressible fluid as it is admitted to said combustion chamber from said first inlet, pumping means adapted to pump said liquid fuel into said combustion chamber through said second inlet and against the pressure of said compressible fluid, ignition means adapted to ignite said compressed fluid to explosion, said exploded compressible fluid adapted to ignite said liquid fuel to explosion, and timing means adapted to close said inlets and open said outlet channelling the force of combustion from said combustion chamber.

2. The invention of claim 1 wherein each said inlet and said outlet are rotary valves, each said valve having a preselected opening therethrough.

3. The invention of claim 1 wherein said combustion chamber includes a series of transfer passages therein dividing said combustion chamber, said compressible fluid and said liquid fuel admitted within said chamber at opposite points with respect to said transfer passages.

4. The invention of claim 3 wherein said transfer passages comprise a network of closely spaced narrow tubes.

5. The invention of claim 1 wherein said ignition means include an injector adapted to inject a spray of fuel into said combustion chamber said injected spray entering said chamber upon closure of said first and second inlets.

6. The invention of claim 1 further including means to inject a fuel within said chamber and said ignition means includes a spark plug.

7. The invention of claim 1 wherein said timing means includes a belt, said belt driving a series of rotating shafts, a first elliptical gear on each said rotating shaft, a second elliptical gear driven by said first gear, said second gear interconnected to a rotary valve, each of said rotary valves adapted to open and close one of said inlets and outlets.

8. The invention of claim 1 wherein each said inlet and said outlet are rotary valves, each said valve being segmented.

9. The invention of claim 1 wherein said chamber further includes cooling means adapted to dissipate the excess heat in said chamber.

10. A method of power generation comprising the steps of the introducing a compressible fluid into a chamber under pressure, introducing of a liquid fuel into said chamber, introducing an atomized fuel into said chamber, maintaining said fuels in substantially segregated relationship until ignition, igniting said atomized fuel and compressed fluid to explosion, said ignition igniting said liquid fuel to explosion and channelling the force of said combustions.

11. A method of power generation comprising the steps of introducing a compressible fluid under pressure into a chamber having transfer passages therein through a first valve, introducing a liquid fuel into said chamber at a point opposite said transfer passages through a second valve, closing said first and second valves, introducing an atomized fuel into said chamber, igniting said atomized fuel and compressed fluid to explosion, said ignition igniting said liquid fuel to explosion, and opening an outlet valve to exit the force of said combustions.

12. The invention of claim 11 wherein said valves are rotary valves.

13. The invention of claim 1 wherein said power generator further includes a separately maintained oxygen supply.

14. The invention of claim 5 wherein said injected fuel is a solid fuel.

References Cited
UNITED STATES PATENTS

| | | | |
|---|---|---|---|
| 597,860 | 1/1898 | Rolfe | 123—32.61 |
| 1,073,717 | 9/1913 | Stachel | 60—39.76 |
| 1,988,456 | 1/1935 | Lysholm | 60—39.55 |
| 2,151,698 | 3/1939 | Harper | 123—32.61 |
| 2,611,239 | 9/1952 | Briggs | 60—39.02 X |
| 2,655,786 | 10/1953 | Carr | 60—267 X |
| 2,662,373 | 12/1953 | Sherry et al. | 60—39.55 |
| 2,671,312 | 3/1954 | Roy | 60—39.48 X |
| 2,781,005 | 2/1957 | Taylor et al. | |
| 2,943,673 | 7/1960 | Hickman | 60—39.48 X |
| 3,139,724 | 7/1964 | Nerad et al. | 60—39.06 |

CARLTON R. CROYLE, *Primary Examiner.*